United States Patent [19]

Fage

[11] 4,362,015
[45] Dec. 7, 1982

[54] DOUBLE JET GAS TURBINE ENGINE EQUIPPED WITH A THRUST REVERSER

[75] Inventor: Etienne Fage, Jouy en Josas, France

[73] Assignee: Astech, Meudon La Foret, France

[21] Appl. No.: 144,675

[22] Filed: Apr. 28, 1980

[30] Foreign Application Priority Data

May 11, 1979 [FR] France .................................. 79 11999

[51] Int. Cl.³ .............................................. F02K 3/06
[52] U.S. Cl. ................................... 60/226 A; 60/230; 60/232; 60/262; 239/265.29
[58] Field of Search .................... 60/226 A, 262, 230, 60/232; 239/265.29

[56] References Cited

U.S. PATENT DOCUMENTS

| 3,100,627 | 8/1963 | Wilde | 60/262 |
| 3,196,609 | 7/1965 | Ingram | 60/262 |
| 3,660,982 | 5/1972 | Gozlan | 60/262 |
| 4,069,663 | 1/1978 | Harper | 60/226 A |
| 4,072,008 | 2/1978 | Kenworthy | 60/262 |
| 4,073,440 | 2/1978 | Hapke | 239/265.29 |

FOREIGN PATENT DOCUMENTS

| 928475 | 6/1961 | United Kingdom | 60/262 |
| 871016 | 6/1963 | United Kingdom | 60/262 |

Primary Examiner—Douglas Hart
Attorney, Agent, or Firm—Merriam, Marshall & Bicknell

[57] ABSTRACT

The present invention relates to a gas turbine engine which is provided with a thrust reverser with unfoldable doors and which is of the double jet type, i.e. comprising a central generator emitting a jet of hot gas and surrounded by an annular by-pass conduit through which a jet of relatively cold gas passes, wherein said turbine engine comprises means for restricting the passage of the jet of relatively cold gas in said annular by-pass conduit when the doors of the thrust reverser are unfolded. The invention results in a simplification of the structure of the doors of the thrust reverser.

11 Claims, 3 Drawing Figures

DOUBLE JET GAS TURBINE ENGINE EQUIPPED WITH A THRUST REVERSER

The present invention relates to a double jet gas turbine engine equipped with a thrust reverser and intended particularly for aircraft.

Double jet gas turbine engines are known to comprise a central generator emitting a jet of hot gas and an annular by-pass conduit surrounding said central generator, and through which a jet of relatively cold gas passes.

At the outlet of these known double jets turbine engines, the ratio 1 of the total pressure of the cold jet to the total pressure of the hot jet is determined by the cycle chosen for these gas turbine engines, i.e. in fact by the performances expected of them, and is generally between 0.9 and 1.1.

The thrust reversers associated with these known gas turbine engines, and in particular their reverser doors, directly receive, when the latter are in unfolded position, the hot central jet and their structure must consequently be provided to withstand the high temperatures. This results in a technologically and materially expensive structure.

Now, it has been found that, when, in a gas turbine engine, the total pressure of the cold peripheral jet was sufficiently greater than that of the hot jet, for example by at least 20% (i.e. 1=1.2), the hot jet at the outlet of such a gas turbine engine was completely "enveloped" by the cold jet and the structure of the associated reverser, with its doors unfolded, was essentially in contact only with the cold peripheral jet.

Consequently, under these conditions, the temperatures to which the reverser is subjected remain moderate and the structure of said reverser may consequently be simplified and rendered less expensive. Up to the present time, this has been impossible. In fact, the respective values of the pressures of the two jets of a double jet gas turbine engine are strictly determined by the general characteristics chosen for each particular engine with a view to obtaining the best possible performances for direct jet. Under these conditions, the values of the existing ratio 1 under the conditions of use of the reverser, i.e. on the ground and at engine speeds close to take-off power, is never equal to the value (1.2) of this ratio, necessary to obtain the favourable effect mentioned above. In view of the multiple requirements to be satisfied, it is not realistic to modify the cycle chosen by a gas turbine engine, with the sole purpose of obtaining, for thrust reversal, the desired conditions and ratio of pressure.

It is an object of the present invention to remedy this drawback. It relates to an improvement in double jet gas turbine engines, equipped with a reverser, which makes it possible to obtain both the best conditions of thrust for direct jet and the best conditions of thrust, different from the preceding ones, for reversed jet.

To this end, according to the invention, the gas turbine engine which is provided with a thrust reverser with unfoldable doors and which is of the double jet type, i.e. comprising a central generator emitting a jet of hot gas and surrounded by an annular by-pass conduit through which a jet of relatively cold gas passes, is noteworthy in that it comprises means for restricting the passage of the jet of relatively cold gas in said annular by-pass conduit when the doors of the thrust reverser are unfolded.

Thus, the air inlet flow in the gas turbine engine being substantially constant at a given speed of engine, if the passage of the jet of relatively cold gas is restricted, the speed thereof is increased, resulting in a drop in the static pressure of the cold air in the outlet plane of the nozzle of the gas turbine engine. This drop in static pressure of the cold jet is reflected in the static pressure of the hot jet in contact therewith, so that the static pressure of the hot jet also decreases. As is well known by those skilled in the art, the total pressure of either jet is a sum of its static pressure and its dynamic pressure, the latter being dependent on and increasing with velocity. In the cold jet, the drop in static pressure due to increased velocity is compensated for by the increase in dynamic pressure resulting from the increased velocity, so that the total pressure of the cold jet remains constant or increases slightly. In the hot jet, although the exit velocity is increased by the drop in static pressure, the increase in velocity (and the consequent increase in dynamic pressure) resulting from the decrease in static pressure is not as great as the increase in velocity (and dynamic pressure) of the cold jet resulting from the restriction in its flow passage. Accordingly, the total pressure (static plus dynamic) of the hot jet, relative to the total pressure of the cold jet, decreases and the ratio 1 of the total pressure of the cold jet to the total pressure of the hot jet increases, in part due to a possible slight increase in the total pressure of the cold jet, but more significantly due to a relative decrease in the total pressure of the hot jet.

Thus, due to the invention, it is possible to obtain, for reversed jet, a value of 1 close to 1.2 whilst, for direct jet, 1 presents its optimal value lower than 1.2.

The control of said means for restricting passage in the annular by-pass conduit is preferably coupled with that of the doors of the reverser.

Said restricting means may be constituted by articulated transverse flaps disposed in said annular by-pass conduit. The axis of articulation of these flaps is advantageously located on the side opposite the hot gas generator and said flaps are in overhang with respect to said axis. Furthermore, these flaps are close to the exhaust nozzle of the gas turbine engine and are connected to a control linkage which cooperates with the doors of the reverser, so that, when the doors are in folded position, the flaps take their retracted position and, when the doors are in unfolded position, these flaps partially obturate said annular by-pass conduit.

The invention will be more readily understood on reading the following description with reference to the accompanying drawings, in which.

Figure 1:
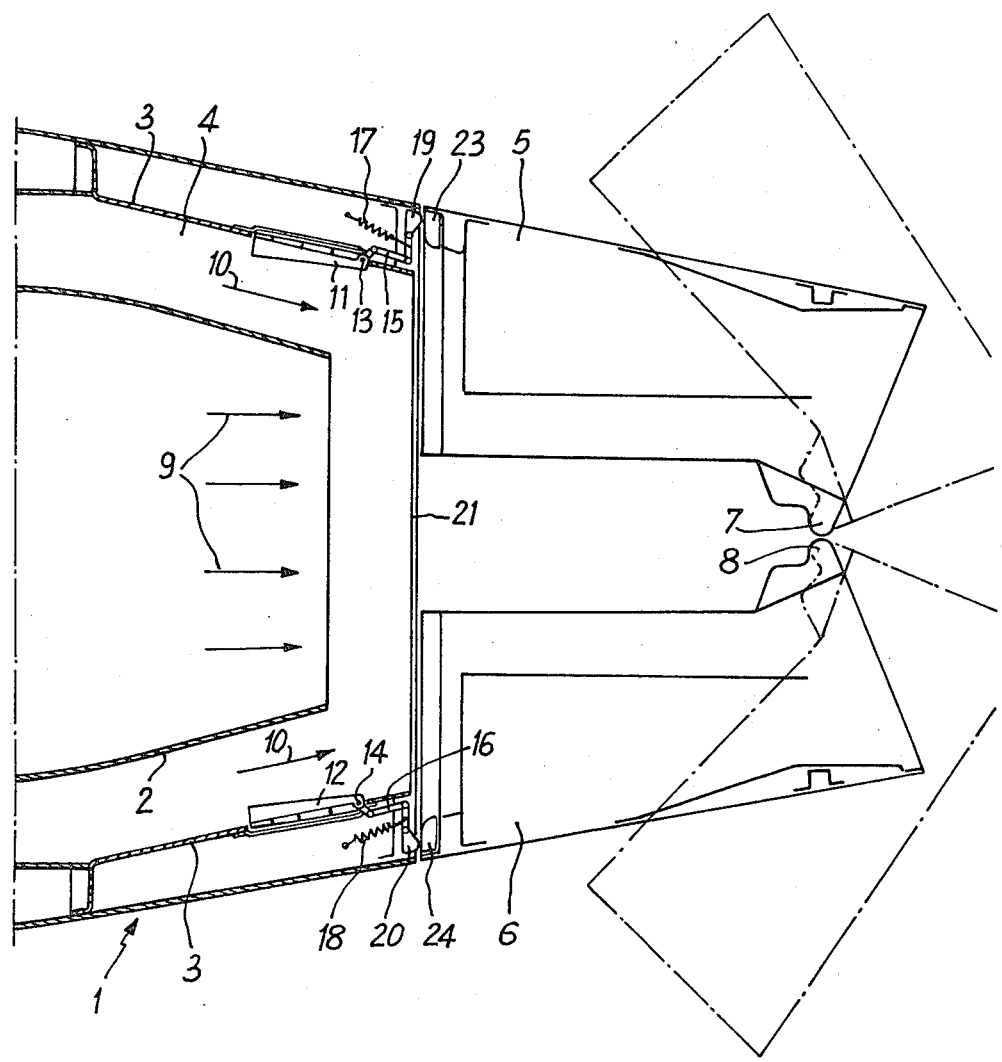
FIG. 1 is a schematic view in section of the rear part of a gas turbine engine according to the invention, the flaps being in retracted position.
Figure 2:
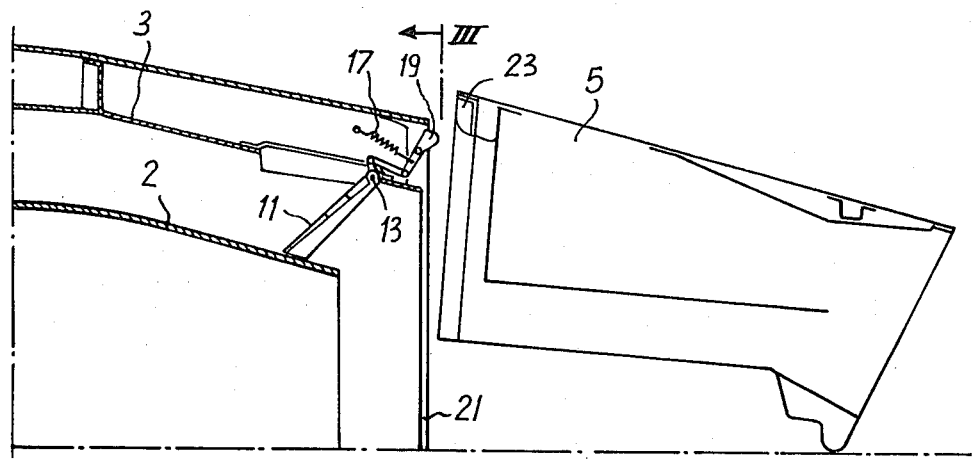
FIG. 2 is a half-view corresponding to FIG. 1, the flaps being in position whereby the passage of a cold gas is restricted.
Figure 3:
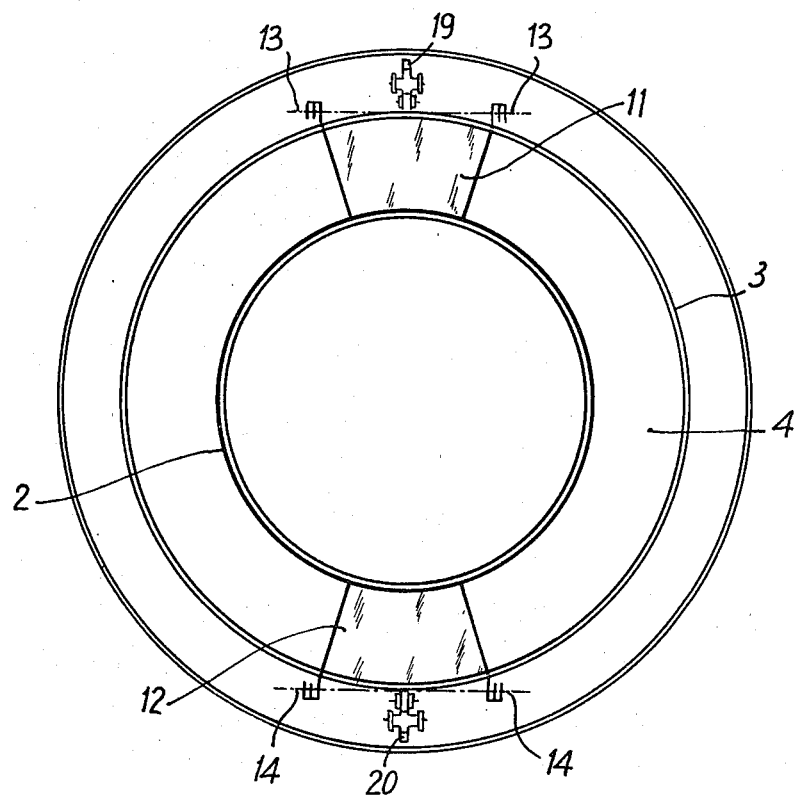
FIG. 3 is a view in the outlet plane of the nozzle of the gas turbine engine according to the invention, corresponding to arrow III of FIG. 2.

Referring now to the drawings, the gas turbine engine 1 according to the invention, whose rear part is shown schematically in section in FIGS. 1 to 3, comprises a central hot gas generator 2, surrounded by a peripheral wall 3, so that an annular conduit 4 is formed between the latter and said generator 2 for passage of a by-passed jet of relatively cold gas.

At the rear of the gas turbine engine 1 there is provided a thrust reverser which comprises two doors 5 and 6 articulated around respective transverse axes 7 and 8. In folded position (in solid lines in FIG. 1), the doors 5 and 6 form an extension of the gas turbine engine 1, whilst in unfolded position (the dashed and dotted lines in FIG. 1 represent an intermediate unfolded position), they are disposed transversely with respect to the jets of gas leaving the gas turbine engine.

The generator 2 emits a jet of hot gas represented by arrows 9, whilst a relatively cold gas, represented by arrows 10, circulates in the annular conduit 4. The gas turbine engine is of known type and, under the normal conditions of operation, the ratio l of the total pressure of the cold jet 10 to the total pressure of the hot jet 9 is between 0.9 and 1.1.

It will therefore be seen that, when the doors 5 and 6 are unfolded, they receive both the hot jet 9 and the cold jet 10. The hot jet 9 strikes them directly and they must be provided to withstand very high temperatures, this resulting in their manufacturing price being high.

It has found that, if the value of the ratio l mentioned hereinabove reached 1.2, the jet of hot air 9 was enveloped by the jet of cold air 10, with the result that this jet of hot air no longer arrived in direct contact with the doors 5 and 6. This situation, which cannot be encountered at present with the known engines, would enable the structure of said doors to be rendered less expensive.

To obtain, for reversed jet (doors 5 and 6 unfolded), a ratio l equal to 1.2, whilst, for direct jet (doors 5 and 6 folded), this ratio is at the most part equal to 1.1, two flaps 11 and 12 are provided, according to the invention, disposed in the annular conduit 4, diametrically opposite each other, in the vicinity of the rear end of the gas turbine engine.

Each flap 11 or 12 is articulated by its rear edge around an axis 13 or 14, which is located on the wall 3, so that said flaps are in overhang with respect to their respective axis. Each of said flaps is in the form of a segment of the annular conduit 4.

A linkage 15 or 16, upon which a spring 17 or 18 respectively acts, is connected to the respective flap 11 or 12. The linkages 15 and 16 each possess a pivoting lever comprising at its free end a cam 19 or 20 respectively, adapted to project outside the outlet plane 21 of the gas turbine engine and to cooperate with a cam 23 or 24 carried respectively by the front edge of the doors 5 and 6.

The action of the springs 17 and 18 tends to cause the cams 19 and 20 to project outside the plane 21 and to cause the flaps 11 and 12 to pivot, so that the latter partially obstruct the conduit 4, their lower edge coming into contact with the wall of the generator 2.

Thus, when the doors 5 and 6 of the reverser are unfolded (cf. FIGS. 2 and 3), the cams 19 and 20 project with respect to the plane 21, whilst the flaps 11 and 12 restrict the section of passage of the conduit 4.

On the other hand, when the doors 5 and 6 of the reverser are closed (cf. FIG. 1), the cams 23 and 24 carried thereby push the cams 19 and 20 and, via the linkage 15 and 16 and against the action of the springs 17 and 18, cause the flaps 11 and 12 to pivot and be disposed in housings 25 in the wall 3, to completely disengage the conduit 4.

Thus, when the doors 5 and 6 of the reverser are unfolded, the section of passage of the conduit 4 is smaller than when the doors are folded. As indicated above, this results in an increase in the ratio l which may reach at least the sought-after value of 1.2. This value may be adjusted by adjusting the number and/or the dimensions of the flaps.

Of course, when the flaps 11 and 12 partially obturate the conduit 4, the performances of the gas turbine engine 1 are reduced, but this is acceptable since it is temporary and occurs only at particular periods of flight of the aircraft, which do not require optimal performances.

It will be noted that the position of obstruction of the flaps (FIG. 2) is particularly stable, since, in this case, inclined from the rear to the front, they are pressed by the cold jet so that their front edge comes into abutment against the generator.

What is claimed is:

1. In a by-pass gas turbine engine comprising a central generator including a central jet exhaust pipe having an exit end adapted to emit a first jet of relatively hot gas;
   an annular by-pass conduit surrounding said central jet exhaust pipe, said by-pass conduit having an exit end adapted to emit a second annular jet of relatively cold gas enveloping said jet of relatively hot gas,
   a thrust reverser located downstream of the exit ends of said jet exhaust pipe and said by-pass conduit, said thrust reverser comprising doors movable between a folded position in which said doors are clear of said jets and an unfolded position in which said doors are disposed transversely in the path of said jets,
   the improvement comprising:
   restricting means for selectively obstructing a portion of the discharge outlet area of said exit end of said by-pass conduit through which said second jet is emitted,
   said restricting means and said reverser being coupled in operation such that said by-pass conduit is obstructed when said doors are unfolded.

2. A gas turbine engine in accordance with claim 1, wherein said restricting means comprise articulated transverse flaps disposed in said annular by-pass conduit and movable between an obstructing position and a retracted position.

3. A gas turbine engine in accordance with claim 1 further including first and second control means for controlling the operation of said doors and said restricting means respectively, said first and second control means being coupled, whereby said by-pass conduit is obstructed when said doors are unfolded.

4. A gas turbine engine in accordance with claim 3 wherein said restricting means comprise articulated transverse flaps disposed in said annular by-pass conduit and movable between an obstructing position and a retracted position.

5. A gas turbine engine in accordance with claim 2 wherein the axes of articulation of said flaps are located on the side of said by-pass conduit opposite said exhaust pipe, said flaps overhanging said axes.

6. A gas turbine engine in accordance with claim 3 wherein said flaps are located adjacent the exhaust end of said by-pass conduit and wherein said second control means comprises a control linkage which cooperates with the doors of said reverser, whereby said flaps are retracted when said doors are folded and said flaps partially obstruct said conduit when said doors are unfolded.

7. A gas turbine engine in accordance with claim 2 wherein each flap has the form of a segment of a circle.

8. A gas turbine engine in accordance with claim 2 wherein each of said flaps is articulated at its rear edge, the front edge thereof abutting said central jet exhaust pipe when said flap is in its obstructing position.

9. A gas turbine engine in accordance with claim 2 wherein each said flap is provided with at least one spring for biasing said flap into its obstructing position.

10. A gas turbine engine in accordance with claim 2 wherein each flap is biased towards its retracted position by a forward edge of said doors when said doors are folded.

11. A gas turbine engine in accordance with claim 2 wherein each flap is provided with a housing for receiving said flap in its retracted position, said housing being located in the wall of said annular conduit opposite said central jet exhaust pipe.

* * * * *